United States Patent
Tsai et al.

(10) Patent No.: US 8,957,834 B2
(45) Date of Patent: Feb. 17, 2015

(54) TIMING CONTROLLER WITH FREQUENCY MODULATION, CONVERTER WITH FREQUENCY MODULATION FOR SCANNING-BASED BACKLIGHT UNIT MODULE, AND CONTROL SYSTEM FOR 3D DISPLAY

(75) Inventors: Yung-Yu Tsai, Chu-Nan (TW); Wei-Chih Shen, Chu-Nan (TW)

(73) Assignee: Innolux Corporation, Jhu-Nan (TW)

( * ) Notice: Subject to any disclaimer, the term of this patent is extended or adjusted under 35 U.S.C. 154(b) by 236 days.

(21) Appl. No.: 13/298,193

(22) Filed: Nov. 16, 2011

(65) Prior Publication Data
US 2012/0287119 A1 Nov. 15, 2012

Related U.S. Application Data

(60) Provisional application No. 61/486,188, filed on May 13, 2011.

(51) Int. Cl.
| G09G 5/00 | (2006.01) |
| H04N 13/04 | (2006.01) |
| H04N 7/01 | (2006.01) |
| G09G 3/00 | (2006.01) |
| G09G 3/34 | (2006.01) |
| G09G 3/36 | (2006.01) |

(52) U.S. Cl.
CPC ....... *H04N 13/0438* (2013.01); *H04N 13/0497* (2013.01); *H04N 13/0452* (2013.01); *H04N 7/0127* (2013.01); *G09G 3/003* (2013.01); *G09G 3/342* (2013.01); *G09G 3/3611* (2013.01); *G09G 2340/0435* (2013.01); *G09G 2310/08* (2013.01); *G09G 5/005* (2013.01); *G09G 2310/024* (2013.01); *G09G 2320/062* (2013.01); *G09G 2320/064* (2013.01); *G09G 2360/18* (2013.01)
USPC .......................................................... 345/6

(58) Field of Classification Search
USPC .............................................. 345/6, 102, 419
See application file for complete search history.

(56) References Cited

U.S. PATENT DOCUMENTS

| 2007/0242068 | A1 * | 10/2007 | Han et al. ...................... 345/419 |
| 2008/0158212 | A1 * | 7/2008 | Maruyama et al. ............ 345/208 |
| 2008/0252578 | A1 * | 10/2008 | Kim et al. ........................ 345/87 |
| 2008/0284719 | A1 * | 11/2008 | Yoshida ......................... 345/102 |
| 2009/0085861 | A1 * | 4/2009 | Lee et al. ....................... 345/102 |
| 2009/0244387 | A1 * | 10/2009 | Lee et al. ....................... 345/419 |

(Continued)

FOREIGN PATENT DOCUMENTS

| CN | 100498913 | 6/2009 |
| CN | 101751866 | 6/2010 |

*Primary Examiner* — Adam J Snyder
(74) *Attorney, Agent, or Firm* — Liu & Liu

(57) ABSTRACT

Timing controller with frequency modulation, converter with frequency modulation for scanning-based backlight unit module, and control system for 3D display. A timing controller with frequency modulation performs display frequency modulation of a first frame rate of a first display signal and outputs a second display signal at a second frame rate greater than or substantially equal to the first frame rate for presentation by a 3D display in a 3D mode or a 2D mode, selectively. A converter with frequency modulation performs scanning frequency modulation of a first scanning frequency of a first control signal generated from the converter and outputs a second control signal at a second scanning frequency greater than or substantially equal to the first scanning frequency, selectively, for controlling the scanning-based backlight unit module of the 3D display.

20 Claims, 7 Drawing Sheets

(56) References Cited

U.S. PATENT DOCUMENTS

| | | |
|---|---|---|
| 2010/0033555 A1 | 2/2010 | Nagase et al. |
| 2010/0066820 A1 | 3/2010 | Park et al. |
| 2010/0110086 A1* | 5/2010 | Yun ............................. 345/520 |
| 2010/0157024 A1* | 6/2010 | Park et al. ...................... 348/51 |
| 2010/0201694 A1* | 8/2010 | Lee et al. ...................... 345/213 |
| 2010/0253678 A1* | 10/2010 | Choi et al. .................... 345/419 |
| 2010/0309381 A1 | 12/2010 | Nakagawa et al. |
| 2011/0012896 A1 | 1/2011 | Ji |
| 2011/0058024 A1* | 3/2011 | Choi et al. ...................... 348/51 |
| 2011/0157332 A1* | 6/2011 | Kim et al. ...................... 348/56 |

* cited by examiner

TIMING CONTROLLER WITH FREQUENCY MODULATION, CONVERTER WITH FREQUENCY MODULATION FOR SCANNING-BASED BACKLIGHT UNIT MODULE, AND CONTROL SYSTEM FOR 3D DISPLAY

This application claims the benefit of U.S. provisional application Ser. No. 61/486,188, filed May 13, 2011, the subject matter of which is incorporated herein by reference.

BACKGROUND

1. Technical Field

The disclosure relates in general to a timing controller, converter, and control system for 3D display, and more particularly to a timing controller with frequency modulation, converter with frequency modulation for scanning-based backlight unit module, and control system for 3D display.

2. Description of the Related Art

For shuttle glasses type 3D technology with scanning backlight unit, a 120 Hz frame rate is required for 3D images for the right and left eyes presented by a 3D display. Referring to FIG. 1, a conventional system for a scanning backlight LCD is shown. A scaler board receives 3D image data and outputs the image data in the form of 2-ch LVDS (Low-Voltage Differential Signaling) signals at 60 Hz. A ME/MC (motion estimation/motion compensation) board converts the 2-ch LVDS signals into 4-ch LVDS signals at 120 Hz. The 4-ch LVDS signals at 120 Hz are inputted to the TCON (timing controller) board and TCON board outputs the digital signal at 120 Hz.

In addition, the T-CON board outputs PWM control signals to a converter to step up the signal levels of the control signals for driving and scanning the BLU (backlight unit) module. For a backlight plate which is divided into a number of regions, such as 8, 16, 32, 64, the signal traces of PWM control signals are complex, leading to signal interference, such as cross-talk problem. In addition, the scanning-based BLU module could also result in glitter of the BLU.

SUMMARY

The disclosure is directed to a timing controller with frequency modulation, converter with frequency modulation for scanning-based backlight unit module, and control system for 3D display.

According to an aspect of the present disclosure, a timing controller with frequency modulation is provided. In an embodiment, in response to a first display signal at a first frame rate, a timing controller with frequency modulation selectively outputs a second display signal at a second frame rate, wherein the second display signal indicates digital signals for presentation by a 3D display. For example, the second frame rate is greater than or equal to the first frame rate.

In an embodiment, a timing controller with frequency modulation includes a frame rate detection unit and a display frequency modulation unit. The frame rate detection unit, in response to a first display signal, outputs a detection signal indicating a first frame rate at which the first display signal is. The display frequency modulation unit, coupled to the frame rate detector, in response to the first display signal and the detection signal, outputs a second display signal at a second frame rate greater than or substantially equal to the first frame rate selectively, wherein the second display signal indicates digital signals for presentation by a display in a 3D mode in which the second frame rate is greater than the first frame rate and the second display signal indicates digital signals for presentation by a display in a 2D mode in which the second frame rate is substantially equal to the first frame rate.

According to another aspect of the present disclosure, a converter with frequency modulation for scanning-based backlight unit module is provided. In an embodiment, in response to a first control signal at a first scanning frequency, a converter with frequency modulation for scanning-based backlight unit module outputs a second control signal at a second scanning frequency selectively, wherein the second control signal indicates signals for controlling scanning-based backlight unit module. For example, the second scanning frequency is greater than or equal to the first scanning frequency.

According to another aspect of the present disclosure, a control system for 3D display is provided. In an embodiment, a control system for 3D display includes a timing controller with frequency modulation and a converter with frequency modulation for scanning-based backlight unit module. In an embodiment, in response to a first display signal at a first frame rate, a timing controller with frequency modulation outputs a second display signal at a second frame rate selectively, wherein the second display signal indicates digital signals for presentation by a 3D display. In an embodiment, in response to a first control signal at a first scanning frequency, the converter with frequency modulation for scanning-based backlight unit module outputs a second control signal at a second scanning frequency selectively, wherein the second control signal indicates signals for controlling scanning-based backlight unit module. In an embodiment, for a 3D mode of a 3D display using the control system, the second frame rate corresponds to a first scanning frequency; the second scanning frequency can be set to be greater than or equal to the first scanning frequency.

In an embodiment, a control system for a 3D display with scanning-based backlight includes a timing controller with frequency modulation for a display panel of the 3D display and a converter with frequency modulation for the scanning-based backlight unit module. The timing controller, in response to a first display signal at a first frame rate, outputs a second display signal at a second frame rate greater than or substantially equal to the first frame rate selectively and outputs a first control signal indicating signals at a first scanning frequency for controlling a scanning-based backlight unit module of the 3D display. The second display signal indicates digital signals for presentation by a display panel of the 3D display in a 3D mode in which the second frame rate is greater than the first frame rate and the second display signal indicates digital signals for presentation by the display panel of the 3D display in a 2D mode in which the second frame rate is substantially equal to the first frame rate. The converter, in response to the first control signal, outputs a second control signal at a second scanning frequency greater than or substantially equal to the first scanning frequency selectively, wherein the second control signal indicates signals for controlling scanning-based backlight unit module, wherein the second frame rate corresponds to the first scanning frequency.

According to another aspect of the present disclosure, a 3D display module is provided. In an embodiment, a 3D display module includes a control system, a 3D display panel, and a scanning-based backlight module. The control system for 3D display includes a timing controller with frequency modulation and a converter with frequency modulation for scanning-based backlight unit module, as exemplified in the above embodiments. In an embodiment, the control system converts a first display signal at a first frame rate into a second display signal at a second frame rate indicating digital signals for presentation by the 3D display panel. In an embodiment, the control system generates a first control signal at a first scanning frequency and converts a first control signal at a first scanning frequency into a second control signal at a second scanning frequency.

According to another aspect of the present disclosure, a method for providing display signals and control signals for a 3D display with scanning-based backlight is provided. In an embodiment, the method includes: (a) in response to a first display signal at a first frame rate, outputting, by a timing controller, a second display signal at a second frame rate greater than or substantially equal to the first frame rate selectively and outputting a first control signal indicating signals at a first scanning frequency for controlling a scanning-based backlight unit module of the 3D display, wherein the second display signal indicates digital signals for presentation by a display panel of the 3D display in a 3D mode in which the second frame rate is greater than the first frame rate and the second display signal indicates digital signals for presentation by the display panel of the 3D display in a 2D mode in which the second frame rate is substantially equal to the first frame rate. The method further includes: (b) in response to the first control signal, outputting, by a converter with frequency modulation for the scanning-based backlight unit module, a second control signal at a second scanning frequency greater than or substantially equal to the first scanning frequency selectively, wherein the second control signal indicates signals for controlling scanning-based backlight unit module, wherein the second frame rate corresponds to the first scanning frequency.

The above and other aspects of the disclosure will become better understood with regard to the following detailed description of the non-limiting embodiments. The following description is made with reference to the accompanying drawings.

DETAILED DESCRIPTION

Embodiments of a timing controller with frequency modulation, converter with frequency modulation for scanning-based backlight unit module, and control system for 3D display are provided.

Figure 1:
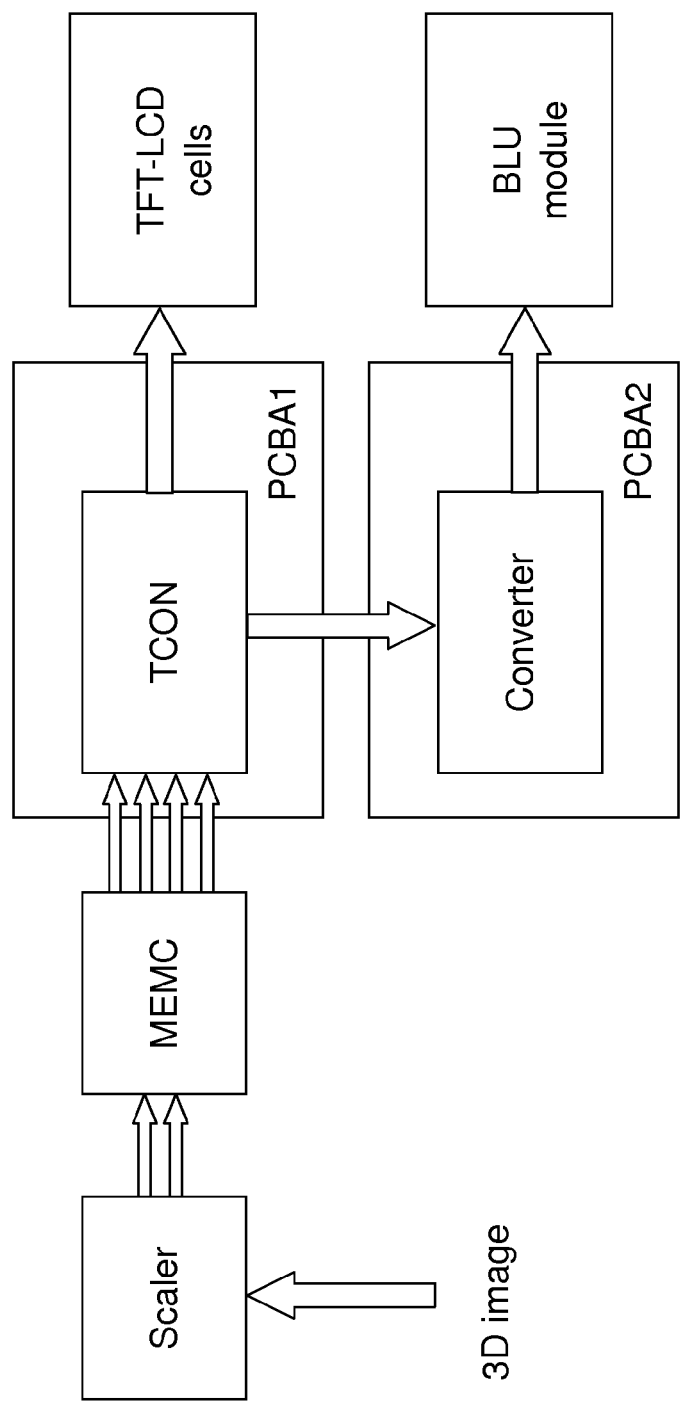
FIG. 1 (Prior Art) is conventional system for a scanning backlight LCD.
Figure 2A:
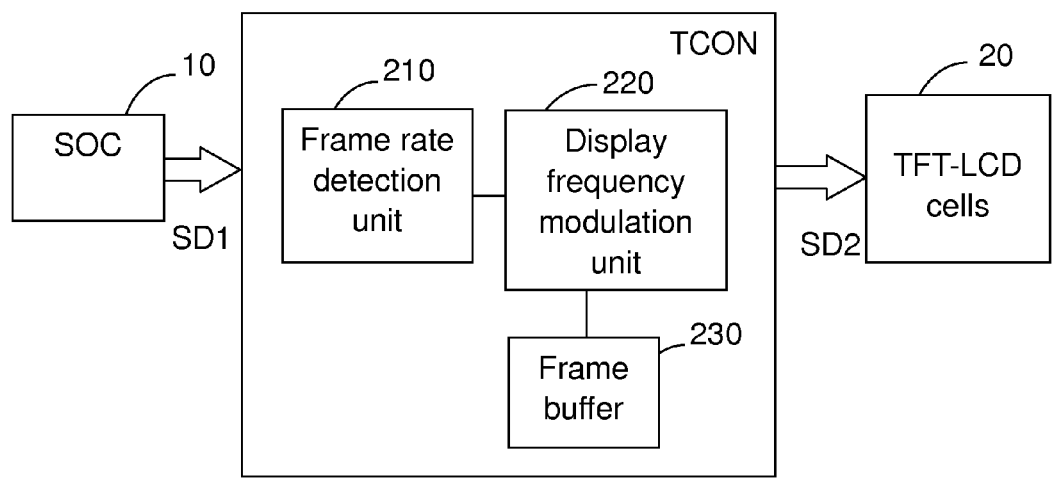
FIGS. 2A-2B illustrate embodiments of a timing controller with frequency modulation.
Figure 2B:
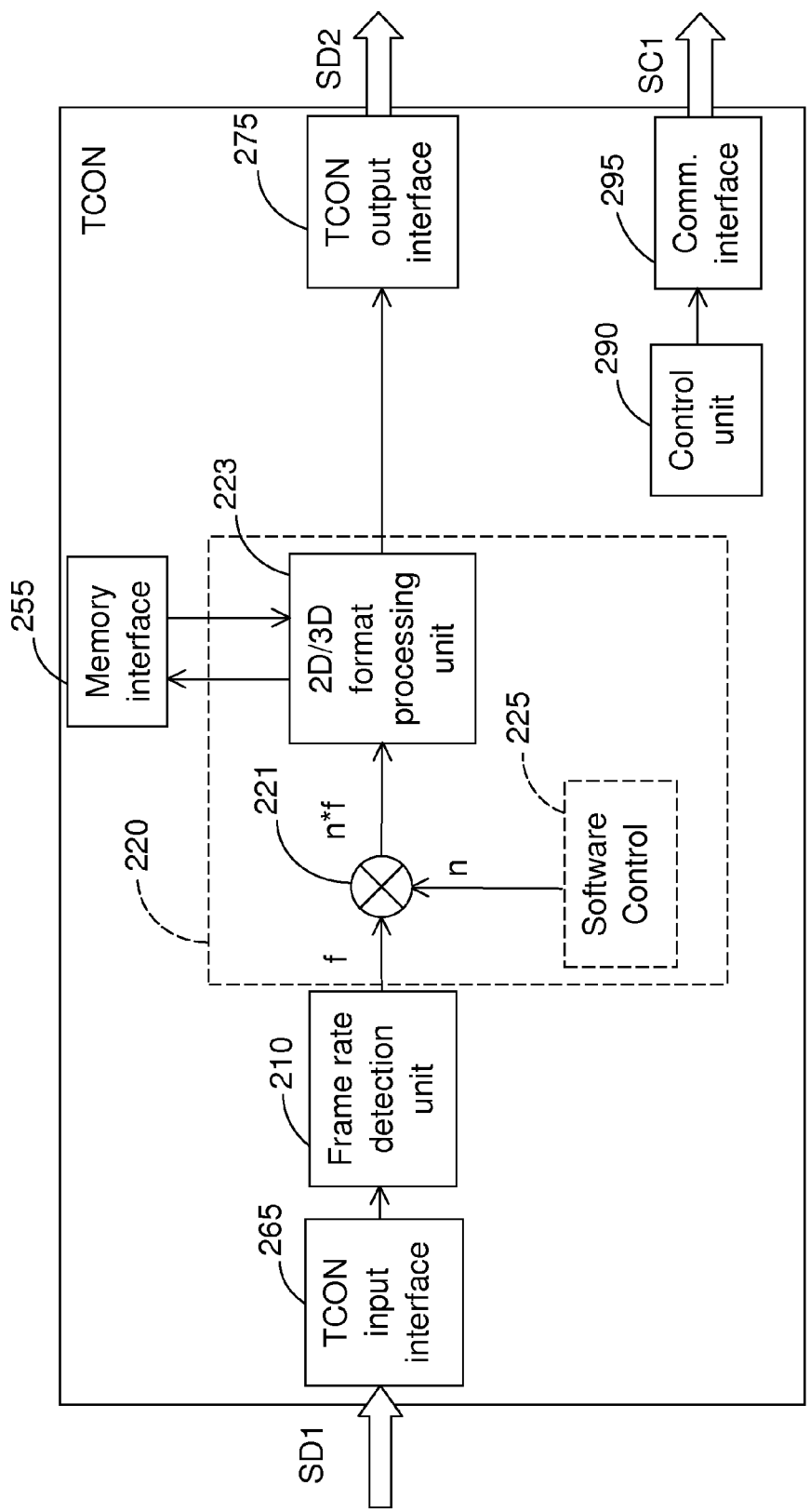

FIGS. 2A-2B illustrate embodiments of a timing controller with frequency modulation. Referring to FIG. 2A, a timing controller TCON is provided according to an embodiment. In the embodiment, in response to a first display signal SD1 at a first frame rate, e.g. denoted by f1=f, a timing controller TCON with frequency modulation selectively outputs a second display signal SD2 at a second frame rate, e.g. denoted by f2=n*f, wherein the second display signal SD2 indicates digital signals for presentation by a 3D display. For example, the second frame rate f2 is greater than or substantially equal to the first frame rate f1, wherein n>=1 and n is a real number, e.g., n=1, 1.1, 1.2, 1.8, 2, 3 and so on. In FIG. 2A, the timing controller TCON includes functional block such as frame rate detection, frequency modulation, and frame buffer, for example. For example, the frame rate detection block of the timing controller TCON detects the frame rate of a first display signal SD1, outputted by a source, such as a chip or a system-on-chip (SOC). According to the first display signal SD1, the frequency modulation of the timing controller TCON generates data after modification or frequency modulation and stores in the frame buffer. The timing controller TCON outputs a second display signal SD2 at a second frame rate, for example, to a display panel, such as a TFT-LCD cell array. For example, the timing controller TCON includes a frame rate detection unit 210 and a display frequency modulation unit 220. The frame rate detection unit 210, in response to a first display signal SD1, outputs a detection signal indicating the first frame rate at which the first display signal SD1 is. The display frequency modulation unit 220, coupled to the frame rate detector 210, in response to the first display signal SD1 and the detection signal, outputs a second display signal SD2 at a second frame rate greater than or substantially equal to the first frame rate selectively. The second display signal SD2 indicates digital signals for presentation by a display in a 3D mode in which the second frame rate is greater than the first frame rate and the second display signal SD2 indicates digital signals for presentation by a display in a 2D mode in which the second frame rate is substantially equal to the first frame rate. In addition, the timing controller TCON can include a frame buffer 230 for buffering data for frequency modulation. In a practical application according to the embodiment, a first display signal SD1 indicates 2-CH LVDS (Low Voltage Differential Signaling) signals at a first frame rate of 50 or 60 Hz for 3D images and a second display signal SD2 indicates driving IC data signals at a second frame rate of 100 or 120 Hz.

Referring to FIG. 2B, a timing controller TCON is provided according to another embodiment. The timing controller TCON includes a frame rate detection unit 210 and a display frequency modulation unit 220. In FIG. 2B, the frame rate detection unit 210 of the timing controller TCON determines the frequency f of input data (e.g., first display signal SD1); e.g., outputting a detection signal indicating the first frame rate of the first display signal SD1. The display frequency modulation unit 220 includes a frequency multiplier 221 and a 2D/3D format processing unit 223. In response to the frequency of the input data or the detection signal, the frequency multiplier 221 outputs a frequency of n*f, wherein n is greater than or substantially equal to 1. In addition, the input data are inputted to a 2D/3D format processing unit 223 for generating output data for displaying by a 3D display panel module, e.g. a 3D TFT-LCD module. In response to the frequency n*f and the first display signal SD1 (or the input data), the 2D/3D format processing unit 223 can convert the input data into output data selectively in a 2D or 3D mode for a 3D display module. That is, the 2D/3D format processing unit 223, in response to the first display signal SD1 and the frequency of n*f, generates the second display signal SD2 at the second frame rate with n greater than 1 in the 3D mode or n substantially equal to 1 in the 2D mode selectively. In an example, the 2D/3D format processing unit 223 can perform motion estimation/compensation (ME/MC) or interpolation for producing output data (display signals) at the target frame rate (n*f) set by the timing controller TCON, for example, by way of software control of TCON 225 (for example, implemented by a control unit, such as a microcontroller). In an example, the timing controller TCON further includes a memory, such as the frame buffer 230 in FIG. 2A, for buffering data produced during the 2D/3D format processing so as to use for the process of the next frame. In other examples, the timing controller TCON can include a memory interface 255 (such as DDR interface or other memory interface) for accessing external memory for buffering data. In some embodiments, the 2D/3D format processing unit 223 converts the first display signal SD1 indicating display data in a first 3D format (such as side-by-side, top-and-bottom, or frame packing 3D format) into the second display signal SD2 indicating display data in a second 3D format for presentation by a 3D display panel compliant with the second 3D format, such as frame-sequential 3D format for a shuttle-glass 3D display.

In an example, the signal format of the input data (e.g., LVDS signals) and output data (e.g., driver IC digital differential data signals) are different, and the timing controller TCON further includes a TCON input interface 265 and a TCON output interface 275 for conversion.

In other embodiments, the timing controller TCON in FIG. 2A or 2B can further include a control unit 290, e.g., a microcontroller such as a 8051-based MCU as exemplified in FIG. 2B, to generate control signals for scanning-based backlight module, wherein the control signals are for controlling different regions of a backlight module. In an example, the control signals may be a number of PWM signals for different regions (e.g., 4, 16, 32, or 64). To reduce the complexity of control signaling, in one embodiment, the timing controller TCON outputs a control signal in a format compliant to an interface format, for example, such serial communication interface format SPI, I2C, and so on. In this way, the number of control signals and the complexity of interface for controlling a backlight unit module can be reduced greatly. For example, a communication interface 295 compliant with SPI or I2C is used for outputting the control signals for controlling the scanning-based backlight module. In addition, the control unit 290 can perform the software control of TCON 225.

Furthermore, since the timing controller TCON as exemplified by FIG. 2A can perform frequency modulation (or modification) of the frame rate of the input data (e.g., 3D display signals), the complexity of the SOC, which outputs the 3D image signal, for interfacing with the TCON can be reduced in order to present 3D effects by the 3D display.

Figure 3A:
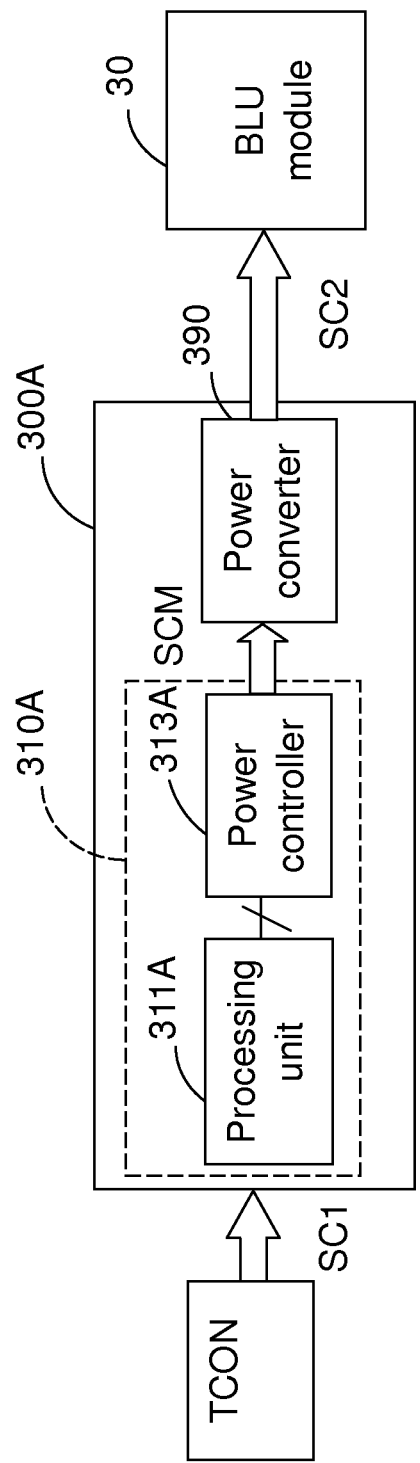
FIGS. 3A-3B illustrate embodiments of a converter with frequency modulation for scanning-based backlight unit module.
Figure 3B:
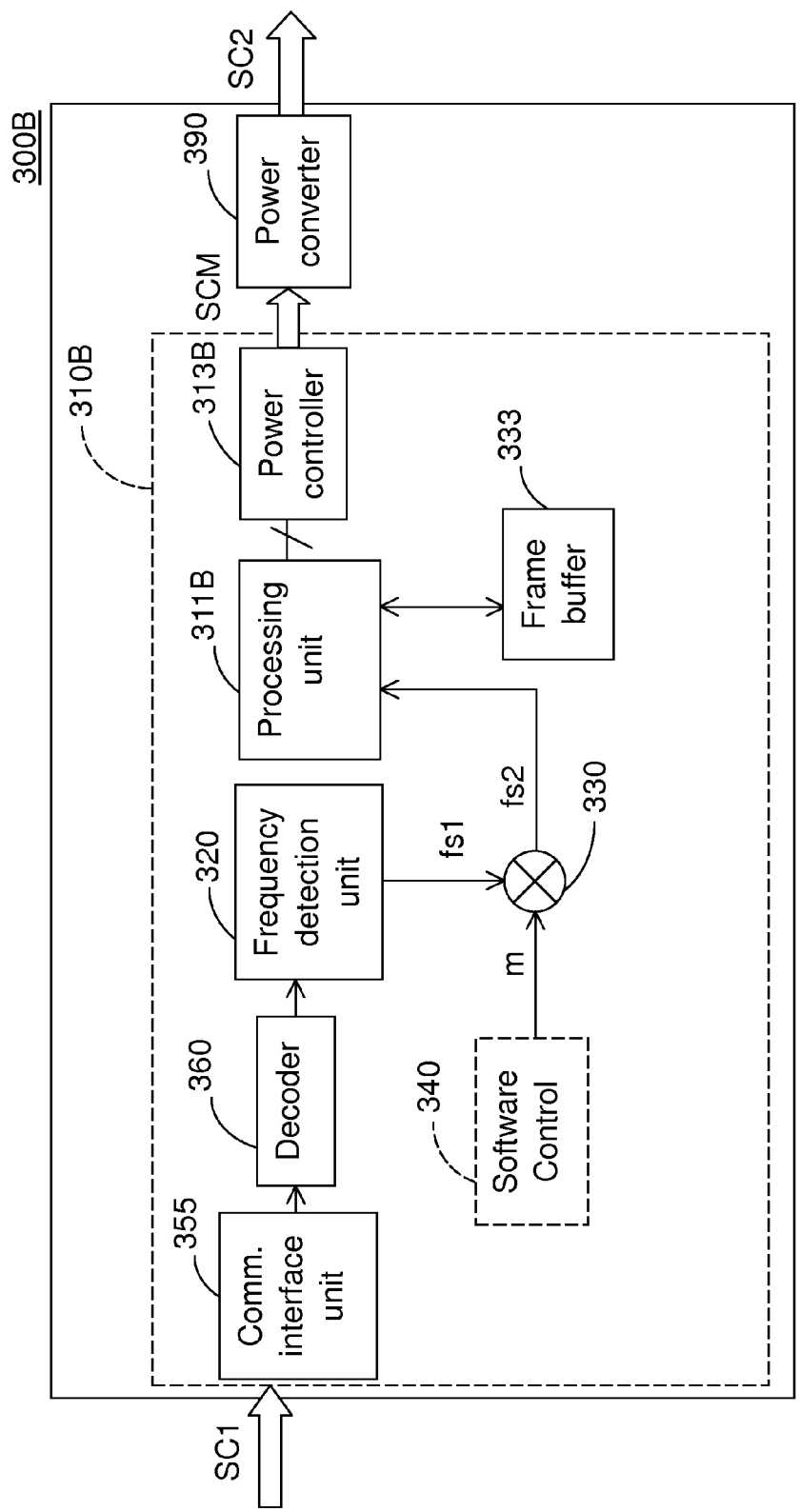

FIGS. 3A-3B illustrate embodiments of a converter with frequency modulation for scanning-based backlight unit module. Referring to FIG. 3A, a converter 300A with frequency modulation for scanning-based backlight unit module is provided according to an embodiment. In the embodiment, in response to a first control signal SC1 at a first scanning frequency fs1 (e.g., fs1=n*f as exemplified in FIG. 2A or 2B), a converter 300A with frequency modulation for scanning-based backlight unit module outputs a second control signal SC2 at a second scanning frequency fs2 (e.g., fs2=m*n*f) selectively, wherein the second control signal SC2 indicates signals for controlling the scanning-based backlight unit module (BLU) module 30 (e.g., LED- or CCFL-based backlight unit module). For example, the second scanning frequency fs2 is greater than or equal to the first scanning frequency (i.e., m>=1, m is positive real number, e.g., m=1.1, 1.9, 2.1, and so on). In FIG. 3A, the converter 300A with frequency modulation includes a scanning frequency modulation unit 310A and a power converter 390. The scanning frequency modulation unit 310A is for modulating (or increasing) the scanning frequency fs1 of the first control signal SC1, for example, outputted from a TCON (e.g., as illustrated in FIG. 2A or 2B), and outputting an intermediate control signal SCM at the second scanning frequency fs2 (e.g., PWM control signals). The power converter 390, such as a boost converter or a step-up converter, converts the intermediate control signal SCM at the second scanning frequency fs2 into the second control signal SC2 at the second scanning frequency fs2, wherein the second control signal SC2 may represent signals for controlling the BLU module 30 with appropriate voltage levels. For example, the scanning frequency modulation unit 310A may be implemented by an integrated circuit including a processing unit or controller 311A (e.g., MCU) and a power controller 313A (e.g., boost controller).

Referring to FIG. 3B, a converter 300B with frequency modulation for scanning-based backlight unit module is provided according to another embodiment. In FIG. 3B, the converter 300B with frequency modulation includes a scanning frequency modulation unit 310B and a power converter 390. The scanning frequency modulation unit 310B, in response to the first control signal SC1, outputting an intermediate control signal SCM indicating control signals at the second scanning frequency fs2 greater than or substantially equal to the first scanning frequency fs1 selectively. The power converter 390, in response to the intermediate control signal SCM, outputting the second control signal SC2 at the second scanning frequency fs2. In an example, the scanning frequency modulation unit 310B includes a processing unit 311B and a power controller 313B, such as a boost controller. The processing unit 311B, in response to the second scanning frequency fs2 and the first control signal SC1, controlling the power controller 313B to output the intermediate control signal SCM. In an example, the scanning frequency modulation unit 310B further includes a frequency detection unit 320 and a frequency multiplier 330. The frequency detection unit 320, in response to the first control signal SC1, outputs a detection signal indicating the first scanning frequency at which the signals for controlling the scanning-based backlight unit module of the 3D display are. The frequency multiplier 330, in response to the detection signal indicating a frequency fs1 of the first scanning frequency, outputs the second scanning frequency of m multiplied by fs1, wherein m is greater than or substantially equal to 1.

In other examples, the scanning frequency modulation unit 310B further includes a communication interface unit 355 for receiving the first control signal SC1; and a decoder 360, coupled between the communication interface unit 355 and the frequency detection unit 320. In the scanning frequency modulation unit 310B, the decoder 360 of the converter 300B with frequency modulation decodes a first control signal SC1 compliant with an interface format (e.g., SPI, I2C, and any serial or parallel interface) and outputs corresponding raw data of the first control signal SC1, which may represent a plurality of control signals for scanning the BLU module. The frequency detection unit 320 of the converter 300B with frequency modulation detects the first scanning frequency fs1 indicated in the raw data. In response to the first scanning frequency fs1, the frequency multiplier 330 of the converter 300B with frequency modulation outputs a second scanning frequency fs2 of m*fs1. A control signal conversion is performed by a controller, such as the processing unit 311B, to output the intermediate control signal SCM at the second scanning frequency fs2 (e.g., PWM control signals) for the power converter 390 (e.g., a boost converter). The control signal conversion, for example, can be performed by, for example, using a processing unit 311B, e.g., a microcontroller, such as a 8051-based MCU, and a power controller 313B, such as a boost controller. In response to the second scanning frequency fs2 and the raw data, the processing unit 311B (e.g., microcontroller) outputs signals for the power controller 313B (e.g., for controlling different regions of the BLU module). The power controller 313B, such as boost controller, outputs the intermediate control signal SCM at the second scanning frequency fs2 (e.g., PWM control signals at the second scanning frequency fs2) for the power converter 390 (e.g., boost converter). In response to the intermediate control signal SCM, the power converter 390 outputs the second control signal SC2 at the second scanning frequency fs2, e.g., a plurality of control signals for scanning a plurality of regions of the BLU module 30. In an example, the scanning frequency modulation unit 310B further includes memory or data buffer 333 for buffering data produced during the scanning frequency modulation for usage. In an example, the multiplier factor m can be set by the software control, for example, by way of software control 340 of the converter 300B with frequency modulation (for example, implemented by a control unit, such as a microcontroller, or the processing unit 311B) or an instruction from the system circuitry of the 3D display. In an example, the scanning frequency modulation unit 310B can be implemented as an integrated circuit.

Figure 4A:
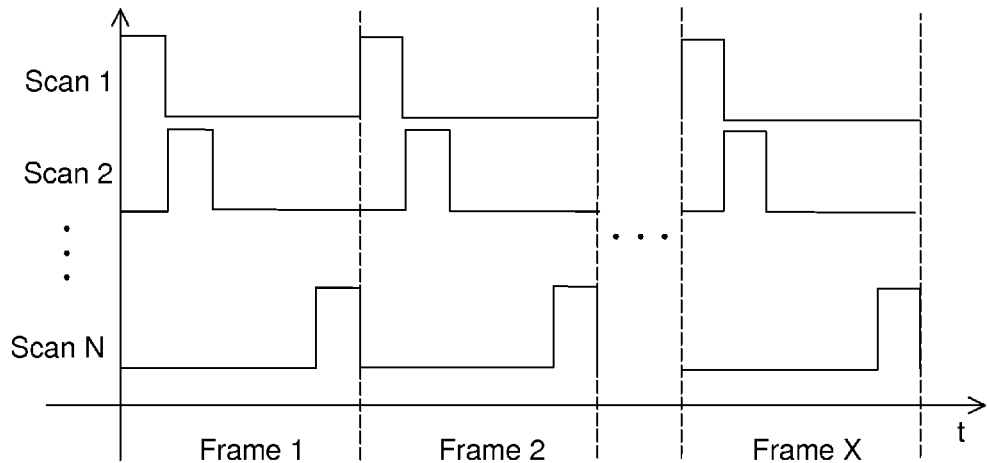
FIGS. 4A-4B illustrate embodiments of timing diagrams of scanning frequency modulation.
Figure 4B:
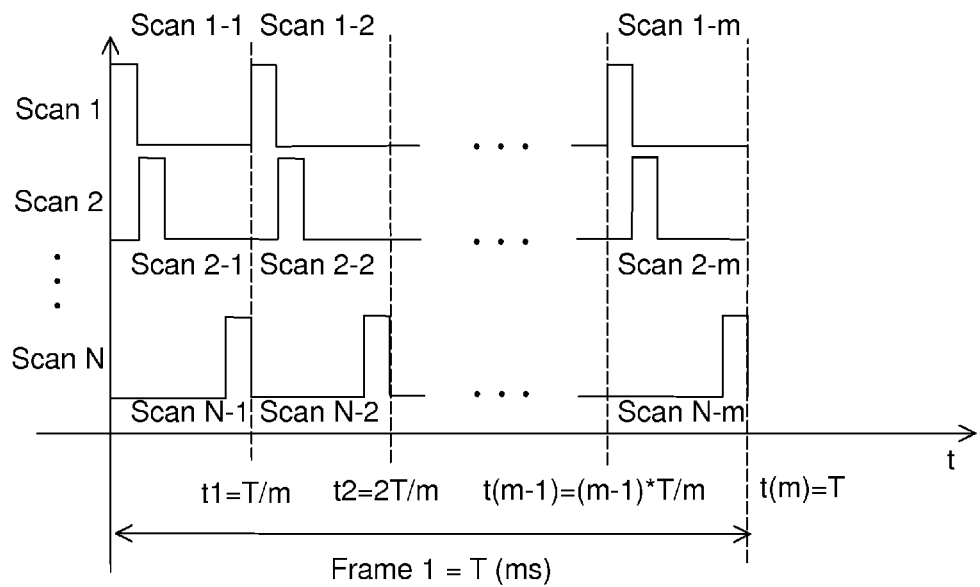

FIGS. 4A-4B illustrate embodiments of timing diagrams of scanning frequency modulation. It is supposed that a first control signal SC1 at a first scanning frequency fs1 applied to the converter with frequency modulation in FIG. 3A or 3B indicates a number of control signals for scanning the BLU unit for every frame, as illustrated by FIG. 4A, wherein the number N indicates that the backlight plate of the BLU module is divided into N regions and N is an integer greater than 1. In FIG. 4A, scan 1 indicates a control signal for a first region, and scan 2 indicates a control signal for a second region and so on. FIG. 4B illustrates an example of a second control signal SC2 at a second scanning frequency fs2 outputted by the converter with frequency modulation in FIG. 3A or 3B. With respect to a multiplier factor m, the N scanning signals for a frame 1, as illustrated in FIG. 4A, are converted into a number of scanning signals, denoted by scan 1-1, scan 2-1, . . . , scan N-1; scan 1-2, scan 2-2, . . . , scan N-2; . . . ; scan 1-$m$, scan 2-$m$, . . . , scan N-m, as illustrated by FIG. 4B, wherein the time interval T of the frame 1 in FIG. 4B is the same as that in FIG. 4A and t1=T/m, t2=2 T/m, . . . , t(m−1)=(m−1)*T/m, and t(m)=T. In FIG. 4B, if it is supposed that m is 2, then two times of N scanning signals are produced according to the embodiment, wherein the first N scanning signals are produced from time 0 to t1=T/m=T/2 and then the next N scanning signals are produced from time t1 to t2=2 T/2=T. In other examples, m can be set to a real number, such as 1.1, 1.9, 3 or so on.

By way of the embodiment of the converter with frequency modulation in FIG. 4A or 4B with scanning frequency modulation, the side effects (e.g., glitter) of 3D display can be reduced. In addition, in some embodiments, the converter with frequency modulation in FIG. 4A or 4B can be configured to receive a first control signal SC1 compliant to an interface format (such as SPI, I2C or so on), the communication between the converter with frequency modulation and the TCON can be implemented by a simplified communication path. Further, in some embodiments, the scanning frequency modulation unit of the converter with frequency modulation can be implemented as an integrated circuit, and, the complexity and problem of the signal traces for a number of control signals can be reduced in this way.

Figure 5:
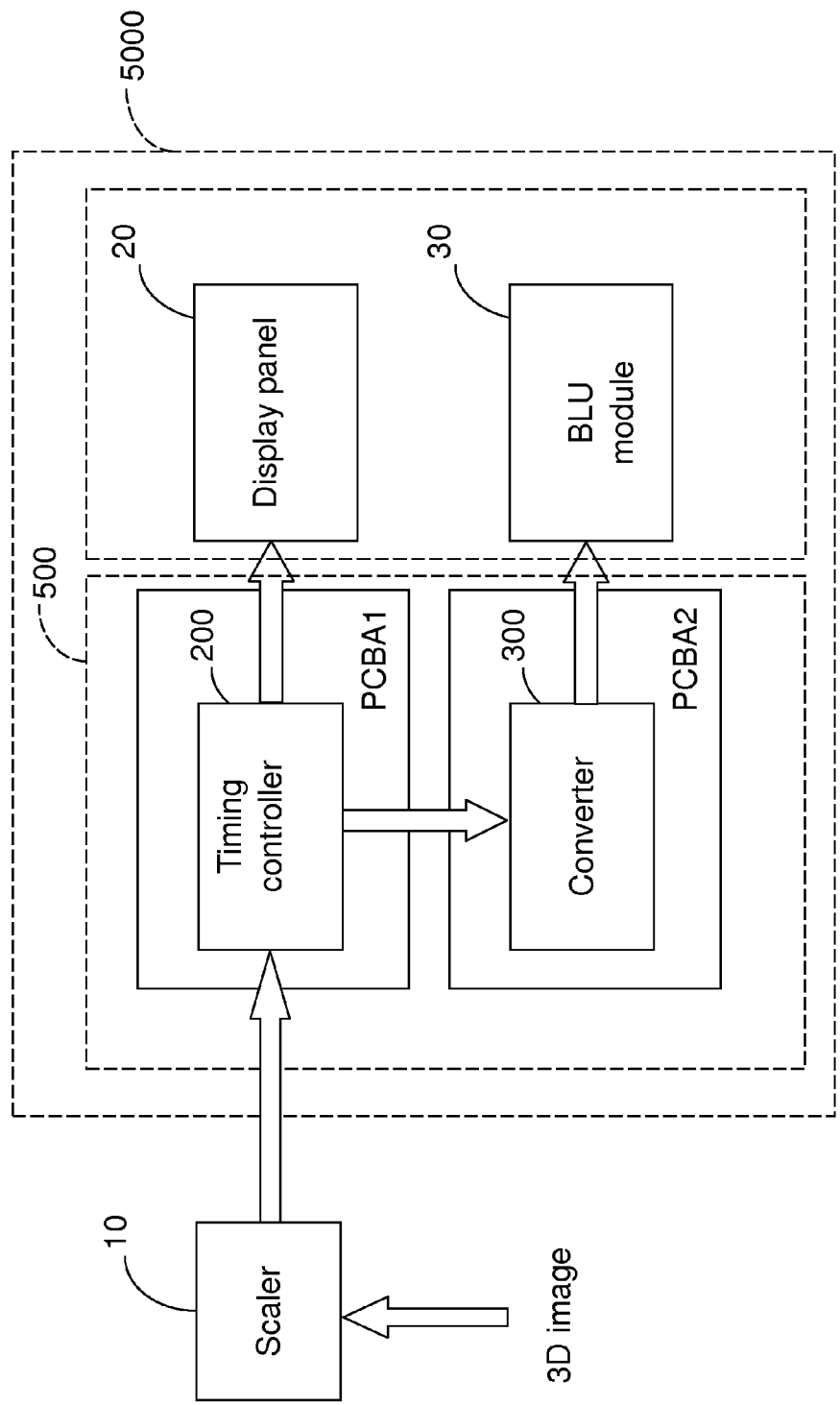
FIG. 5 is a block diagram showing a 3D display apparatus with a 3D display module according to an embodiment.

FIG. 5 is a block diagram showing a 3D display apparatus 5000 with a 3D display module according to an embodiment. In the embodiment, the 3D display apparatus 5000 includes a control system 500, a 3D display panel 20 (e.g., a TFT-LCD panel), and a scanning-based backlight module 30. In an embodiment, a control system 500 for 3D display 5000 includes a timing controller (TCON) 200 with frequency modulation and a converter 300 with frequency modulation for scanning-based backlight unit module. In an embodiment, in response to a first display signal SD1, e.g., outputted from a scaler 10, at a first frame rate f1, the timing controller 200 with frequency modulation outputs a second display signal SD2 at a second frame rate f2 (e.g., f2=n*f1; n>=1) selectively, wherein the second display signal SD2 indicates digital signals for presentation by a 3D display. In an embodiment, in response to a first control signal SC1 at a first scanning frequency fs1, the converter 300 with frequency modulation for scanning-based backlight unit module outputs a second control signal SC2 at a second scanning frequency fs2 (e.g., fs2=m*fs1) selectively, wherein the second control signal SC2 indicates signals for controlling scanning-based backlight unit module. In an example, for a 3D mode of a 3D display using the control system, the second frame rate f2 is the same as or corresponds to a first scanning frequency fs1; the second scanning frequency fs2 can be set to be greater than or equal to the first scanning frequency fs1 (i.e., m>=1). In an example, the TCON can selectively output 2D data or 3D data for displaying by a 3D display.

Further, a method for providing display signals and control signals for a 3D display with scanning-based backlight is provided according to other embodiments. The method includes: in response to a first display signal at a first frame rate, outputting, by a timing controller, a second display signal at a second frame rate greater than or substantially equal to the first frame rate selectively and outputting a first control signal indicating signals at a first scanning frequency for controlling a scanning-based backlight unit module of the 3D display (step a). The second display signal indicates digital signals for presentation by a display panel of the 3D display in a 3D mode in which the second frame rate is greater than the first frame rate and the second display signal indicates digital signals for presentation by the display panel of the 3D display in a 2D mode in which the second frame rate is substantially equal to the first frame rate. The method further includes: in response to the first control signal, outputting, by a converter with frequency modulation for the scanning-based backlight unit module, a second control signal at a second scanning frequency greater than or substantially equal to the first scanning frequency selectively, wherein the second control signal indicates signals for controlling scanning-based backlight unit module, wherein the second frame rate corresponds to the first scanning frequency (step b). It is noted that steps a and b can be performed simultaneously or in any order.

In an example, step a includes the following steps. In response to the first display signal, outputting, by a frequency detection unit, a detection signal indicating the first frame rate at which the first display signal is (step a1) is performed. In response to the detection signal indicating a frequency f of the first frame rate, outputting, by a frequency multiplier, a frequency of n multiplied by f, wherein n is greater than or substantially equal to 1 (step a2) is performed. In response to the first display signal and the frequency of n multiplied by f, generating the second display signal at the second frame rate with n greater than one in the 3D mode or n substantially equal to one in the 2D mode selectively (step a3) is performed. Outputting, by the timing controller, the first control signal for controlling the scanning-based backlight unit module (step a4) is performed.

In an example, step b includes the following steps. In response to the first control signal, outputting an intermediate control signal indicating control signals at the second scanning frequency greater than or substantially equal to the first scanning frequency selectively (step b1) is performed. In response to the intermediate control signal, outputting, by a power converter, the second control signal at the second scanning frequency (step b2) is performed.

In an example, the step of outputting the intermediate control signal includes the following steps. In response to the first control signal, outputting a detection signal indicating the first scanning frequency at which the signals for controlling the scanning-based backlight unit module of the 3D display are is performed. In response to the detection signal indicating a frequency fs1 of the first scanning frequency, outputting the second scanning frequency of m multiplied by fs1, wherein m is greater than or substantially equal to 1, is performed.

As disclosed above, the timing controller and converter as illustrated FIGS. 2A-3B and the control system in FIG. 5 are for the sake of illustration and other implementation can be made accordingly. For example, by way of the method indicated above and related examples, a control system including a timing controller and a converter, as illustrated in FIG. 5, can be implemented for providing display signals and control signals for a 3D display with scanning-based backlight.

Since a timing controller implementing step a of the method can perform display frequency modulation (or modification) of the frame rate of the input data (e.g., 3D display signals), the complexity of the SOC, which outputs the 3D image signal, for interfacing with the TCON can be reduced in order to present 3D effects by the 3D display. By way of a converter implementing step b of the method with scanning frequency modulation, the side effects (e.g., glitter) of 3D display can be reduced.

Furthermore, the timing controller or converter, can be implemented as an integrated circuit, or by using a processing unit such as a microprocessor, a digital signal processor (DSP), or logic circuit, or implemented by or using an application specific integrated circuits (ASIC), field-programmable gate array (FPGA), or a system-on-chip (SOC).

While the disclosure has been described by way of example and in terms of the exemplary embodiment(s), it is to be understood that the disclosure is not limited thereto. On the contrary, it is intended to cover various modifications and similar arrangements and procedures, and the scope of embodiments therefore should be accorded the broadest interpretation so as to encompass all such modifications and similar arrangements and procedures.

What is claimed is:

1. A timing controller with frequency modulation, comprising:
    a frame rate detection unit detecting a first frame rate of a first display signal that is a frequency signal, and in response to the first display signal, outputting a detection signal indicating the first frame rate of the first display signal; and
    a display frequency modulation unit, coupled to the frame rate detection unit, the display frequency modulation unit, in response to the first display signal and the detection signal, outputting a second display signal at a second frame rate greater than or substantially equal to the first frame rate selectively,
    wherein the second display signal indicates digital signals for presentation by a display in a 3D mode in which the second frame rate is greater than the first frame rate and the second display signal indicates digital signals for presentation by a display in a 2D mode in which the second frame rate is substantially equal to the first frame rate, and
    wherein the display frequency modulation unit comprises a 2D/3D format processing unit, in response to the first display signal and the first frame rate multiplied by n, performing motion estimation or motion compensation or interpolation for generating the second display signal at the second frame rate with n greater than 1 in the 3D mode or n substantially equal to 1 in the 2D mode selectively.

2. The timing controller with frequency modulation according to claim 1, wherein the display frequency modulation unit further comprises:
    a frequency multiplier, in response to the detection signal indicating a frequency f of the first frame rate, outputting the first time rate multiplied by n.

3. The timing controller with frequency modulation according to claim 2, further comprising:
    a memory, coupled to the 2D/3D format processing unit, buffering data produced by the 2D/3D format processing unit.

4. The timing controller with frequency modulation according to claim 1, wherein the display frequency modulation unit further generates a plurality of control signals for enabling a scanning-based backlight module to control different regions of a backlight module.

5. The timing controller with frequency modulation according to claim 4, wherein the display frequency modulation unit outputs the control signals through a serial communication interface.

6. A control system for a 3D display with scanning-based backlight, comprising:
    a timing controller with frequency modulation for a display panel of the 3D display, the timing controller detecting a first frame rate of a first display signal that is a frequency signal, and in response to the first display signal, outputting a second display signal at a second frame rate greater than or substantially equal to the first frame rate selectively and outputting a first control signal indicating signals at a first scanning frequency for controlling a scanning-based backlight unit module of the 3D display, wherein the second display signal indicates digital signals for presentation by a display panel of the 3D display in a 3D mode in which the second frame rate is greater than the first frame rate and the second display signal indicates digital signals for presentation by the display panel of the 3D display in a 2D mode in which the second frame rate is substantially equal to the first frame rate, wherein the timing controller comprises a display frequency modulation unit, which comprises a 2D/3D format processing unit, in response to the first display signal and the first frame rate multiplied by n, performing motion estimation or motion compensation or interpolation for generating the second display signal at the second frame rate with n greater than 1 in the 3D mode or n substantially equal to 1 in the 2D mode selectively; and
    a converter with frequency modulation for the scanning-based backlight unit module, the converter, in response to the first control signal, outputting a second control signal at a second scanning frequency greater than or substantially equal to the first scanning frequency selectively, wherein the second control signal indicates signals for controlling scanning-based backlight unit module, wherein the second frame rate corresponds to the first scanning frequency.

7. The control system according to claim 6, wherein the converter comprising:
    a scanning frequency modulation unit, in response to the first control signal, outputting an intermediate control signal indicating control signals at the second scanning frequency greater than or substantially equal to the first scanning frequency selectively; and a power converter, in response to the intermediate control signal, outputting the second control signal at the second scanning frequency.

8. The control system according to claim 7, wherein the scanning frequency modulation unit comprises:

a power controller; and a processing unit, in response to the second scanning frequency and the first control signal, controlling the power controller to output the intermediate control signal.

9. The control system according to claim 8, wherein the scanning frequency modulation unit further comprises:

a frequency detection unit, in response to the first control signal, outputting a detection signal indicating the first scanning frequency at which the signals for controlling the scanning-based backlight unit module of the 3D display are; and a frequency multiplier, in response to the detection signal indicating a frequency fs1 of the first scanning frequency, outputting the second scanning frequency of m multiplied by fs1, wherein m is greater than or substantially equal to 1.

10. The control system according to claim 9, wherein the scanning frequency modulation unit further comprises:

a communication interface unit for receiving the first control signal; and a decoder, coupled between the communication interface unit and the frequency detection unit, for decoding the first control signal compliant with an interface format and outputting corresponding raw data of the first control signal.

11. The control system according to claim 6, wherein the timing controller further comprises:

a frame rate detection unit, in response to the first display signal, outputting a detection signal indicating the first frame rate at which the first display signal is, wherein the display frequency modulation unit is coupled to the frame rate detection unit, and the display frequency modulation unit, in response to the first display signal and the detection signal, outputs the second display signal at the second frame rate greater than or substantially equal to the first frame rate selectively and outputs the first control signal.

12. The control system according to claim 11, wherein the display frequency modulation unit further comprises:

a frequency multiplier, in response to the detection signal indicating a frequency f of the first frame rate, outputting the first frame rate multiply by n; and a control unit for outputting the first control signal.

13. The control system according to claim 12, further comprising:

a memory, coupled to the 2D/3D format processing unit, buffering data produced by the 2D/3D format processing unit.

14. The control system according to claim 11, wherein the display frequency modulation unit further generates a plurality of control signals to control different regions of the scanning-based backlight unit module.

15. The control system according to claim 14, wherein the display frequency modulation unit outputs the control signals through a serial communication interface.

16. A method for providing display signals and control signals for a 3D display with scanning-based backlight, comprising:

(a) detecting a first frame rate of a first display signal that is a frequency signal, and in response to the first display signal, outputting, by a timing controller, a second display signal at a second frame rate greater than or substantially equal to the first frame rate selectively and outputting a first control signal indicating signals at a first scanning frequency for controlling a scanning-based backlight unit module of the 3D display, wherein the second display signal indicates digital signals for presentation by a display panel of the 3D display in a 3D mode in which the second frame rate is greater than the first frame rate and the second display signal indicates digital signals for presentation by the display panel of the 3D display in a 2D mode in which the second frame rate is substantially equal to the first frame rate, wherein the timing controller comprises a display frequency modulation unit, which comprises a 2D/3D format processing unit, in response to the first display signal and the first frame rate multiplied by n, performing motion estimation or motion compensation or interpolation for generating the second display signal at the second frame rate with n greater than 1 in the 3D mode or n substantially equal to 1 in the 2D mode selectively; and (b) in response to the first control signal, outputting, by a converter with frequency modulation for the scanning-based backlight unit module, a second control signal at a second scanning frequency greater than or substantially equal to the first scanning frequency selectively, wherein the second control signal indicates signals for controlling scanning-based backlight unit module, wherein the second frame rate corresponds to the first scanning frequency.

17. The method according to claim 16, wherein the step (a) comprises:

in response to the first display signal, outputting, by a frequency detection unit, a detection signal indicating the first frame rate at which the first display signal is; and in response to the detection signal indicating a frequency f of the first frame rate, outputting, by a frequency multiplier, the first frame rate multiplied by n; and outputting, by the timing controller, the first control signal for controlling the scanning-based backlight unit module.

18. The method according to claim 16, wherein the step (b) comprises:

in response to the first control signal, outputting an intermediate control signal indicating control signals at the second scanning frequency greater than or substantially equal to the first scanning frequency selectively; and in response to the intermediate control signal, outputting, by a power converter, the second control signal at the second scanning frequency.

19. The method according to claim 18, wherein the step of outputting the intermediate control signal comprises:

in response to the first control signal, outputting a detection signal indicating the first scanning frequency at which the signals for controlling the scanning-based backlight unit module of the 3D display are; and in response to the detection signal indicating a frequency fs1 of the first scanning frequency, outputting the second scanning frequency of m multiplied by fs1, wherein m is greater than or substantially equal to 1.

20. The method according to claim 16, wherein the first control signal is outputted through a serial communication interface.

* * * * *